June 15, 1965 A. PAIONE 3,189,423
GLASS BULB CUT OFF METHOD
Filed Jan. 15, 1962 2 Sheets-Sheet 1

INVENTOR.
ANGELO PAIONE

BY *Harris M. Pearson*

ATTORNEY

June 15, 1965 A. PAIONE 3,189,423
GLASS BULB CUT OFF METHOD
Filed Jan. 15, 1962 2 Sheets-Sheet 2

INVENTOR.
ANGELO PAIONE

BY
*Harris M. Isaacson*

ATTORNEY

United States Patent Office 3,189,423
Patented June 15, 1965

3,189,423
GLASS BULB CUT OFF METHOD
Angelo Paione, Lewiston, Maine, assignor to Paragon Glass Works, Inc., Lewiston, Maine
Filed Jan. 15, 1962, Ser. No. 166,193
4 Claims. (Cl. 65—105)

In the past the manufacture of blown glass articles such as Christmas tree ornaments, blown either by machine or by hand, required the distinct step of blowing the bulb and the distinct step, separate of the blowing operation or separate from a blowing machine, of cutting off the waste. The waste portion of the blown article usually was the connecting link between the blown article and the blowing operation.

Removal of waste has been effected in various ways in the past, such as burning off, which is a heat cutting off in one form or another, or cutting off of the waste by use of grinding techniques often by hand with or without application of heat.

Burning off to finish an article in its final shape for use, as distinguished from just separating the article from the blowing tube, usually was performed apart from a blowing machine or the initial blowing operation as a separate step, by a flame being applied to a cut off area and the waste removed by pulling it off or by being allowed to drop off under its own weight. After the burn off, the edges of the blown article oftentimes had to be further finished to form an even bead, a smooth rounded edge. Burning off the waste usually wasted at least the glass of the waste itself, required a separate operation and oftentimes encountered some problems in obtaining a properly formed bead or rounded edge.

A rounded edge on the end of a blown glass article tends to provide structural strength to the article. The edge allows easier handling in manufacturing operations and longer wear of an article in actual end use.

An alternative to burning off the waste has been to grind it off, often by hand. The waste was cut off by cutting devices such as grinding wheels with or without the aid of the flame. The ground edges of a bulb oftentimes had to be finished to form a protective bead or smoother edge. Grinding off the waste itself often resulted in breakage and usually wasted as much glass as when the waste was burned off.

According to the present invention a shaped glass article such as a blown bulb of a Christmas tree ornament is burned off as part of the operation of a glass blowing machine or separately, while simultaneously cooling the bulb to reduce its internal pressure thereby causing the softening glass at the cut off point to be drawn inward, and leaving a rounded edge on the neck of the bulb formed in the cut off step and without the waste of glass.

Although such novel features as are believed to be characteristic of the invention are pointed out in the claims, the invention and the manner in which it may be carried out, may be further understood by reference to the description following and the accompanying drawings.

Referring now to the figures in greater detail, like reference numbers denote like parts in the various figures.

Figure 1:
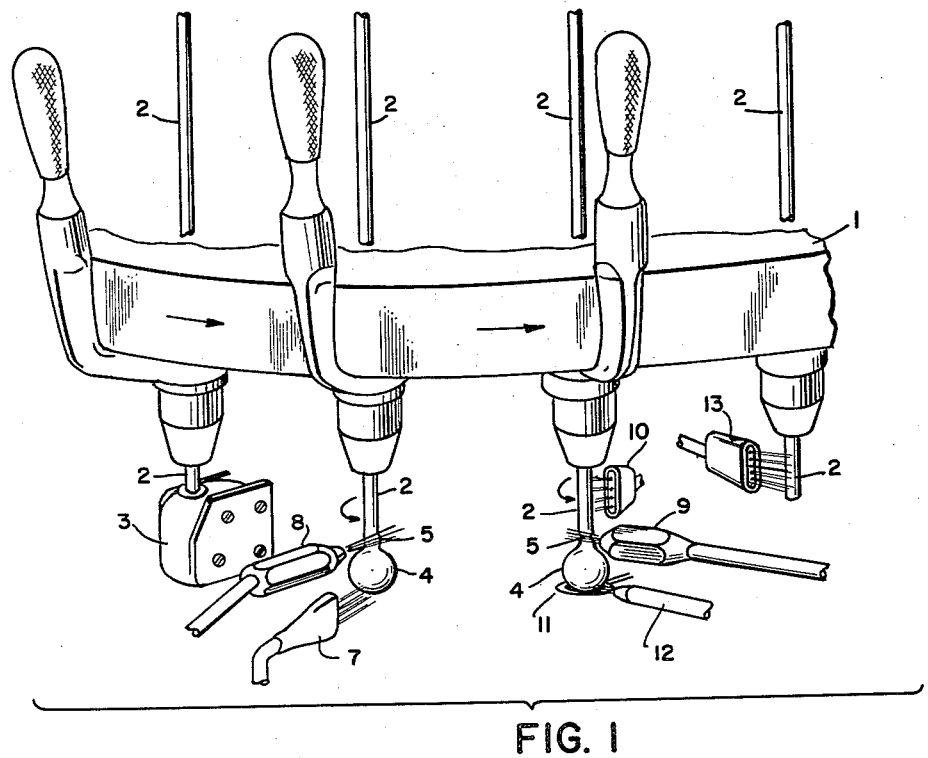
FIGURE 1 is a front elevation of a conventional glass blowing machine including the present invention.

In FIG. 1 a glass blowing machine 1 which is adapted to blow and process glass tubing in progressive steps is shown in various stages of blowing and cutting glass tubes.

The progressive steps shown in FIG. 1 include blowing a glass tube 2 in a blowing mold 3 where an already heated and softened glass tube 2 with its lower end closed is being blown in the blowing mold 3 by the application of pressure from the end (not shown) of the glass tube 2.

Simultaneously as shown in FIG. 1 a blown bulb 4 on the end of another glass tube 2, which has already emerged from the mold 3, is being preheated at its cut off area 5 at the end of the neck 6 of the blown bulb 4 preparatory to having the bulb 4 cut off, in a further step.

In the preheating step a flame of a warming burner 7 is impinged upon the blown bulb 4 primarily to prevent cracking of the bulb 4 by too rapid cooling from the temperature it emerges from the mold 3. The bulb 4 and tube 2 are rotated about their vertical axis during the preheat phase by rotating means (not shown). The flame of a preheat burner 8 is impinged on the cut off area 5 at the neck 6 of the bulb 4 where the bulb 4, which is still attached to the glass tube 2 will be cut off in the next step. The preheating is done while the tube 2 and bulb 4 are rotating and while the bulb 4 is being warmed by the flame from the warming burner 7. The cut off stage is simultaneously being carried on another bulb 4 and tube 2 in the blowing machine. The preheat burner 8 has a hot narrow flame. The flame of the preheat burner 8 heats the neck 6 in the cut off area 5 rapidly yet slowly enough not to cause the tube 2 or bulb 4 to crack.

The rotation of the tube 2 and bulb 4 about their vertical axis helps distribute the heat from the burners 7, 8 as further protection against uneven distribution of heat which is one cause of cracking.

Figure 2:
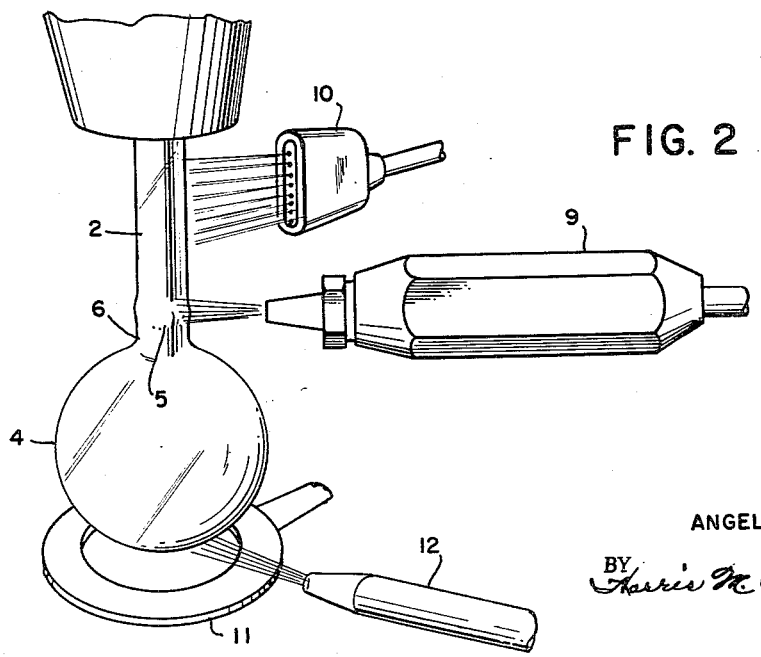
FIGURE 2 is a detail of FIGURE 1 showing the cut off stage of the present invention.
Figure 3:
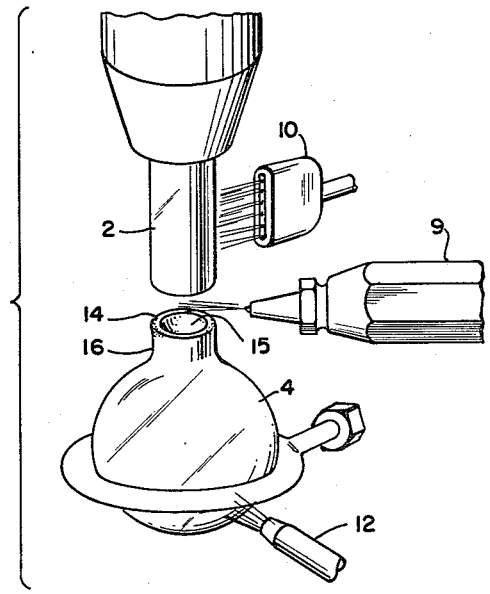
FIGURE 3 is a detail of the cut off stage of the present invention showing a cut off bulb after severance.

In FIG. 1, FIG. 2, and FIG. 3 the cut off phase in the operation of the glass blowing machine is shown. In FIGS. 1 and 2 another tube 2 with a blown bulb 4 is allowed to cool, having no heat applied to it. The flame from the cut off burner 9 is impinged upon the cut off area 5 which was preheated in the prior step. The flame of the cut off burner 9 is very hot and concentrated in a very narrow area. Aided by the preheating of the glass in the prior step, the flame of the cut off burner 9 rapidly causes the glass in the cut off area 5 to become viscous. The glass tube 2 and bulb 4 in the cut off phase are rotated about their vertical axis, again helping to evenly distribute the heat.

In the cut off phase another warming burner 10 is employed. The warming burner 10 warms the glass tube 2 above the neck 6 of the bulb 4. The warming burner 10 tends to serve a double function, that of preparing the glass tube 2 for further steps in the progress of the glass blowing machine 1 and that of keeping the tube 2 hotter than the bulb 4. In the cut off phase a catcher ring 11 is in position beneath the bulb 4. The catcher ring 11 is adapted to catch the bulb 4 as it is severed. In the cut off phase a cooling jet 12 is in position adapted to impinge a jet of cool gas on the area of the bulb 4 to rapidly cool the bulb 4.

The tube 2 from which the bulb 4 is blown is sealed (not shown) after emerging from the blowing phase. Though the bulb 4 is warmed while the cut off area 5 is being preheated after it emerges from its mold 3, the sealed tube 2 and bulb 4 still tend to cool from its temperature during the blowing phase. The cooling of the sealed tube 2 tends to reduce the pressure within the tube 2 and blown bulb 4. In the cut off phase generally no warming is applied to the bulb 4 allowing it to cool further and more rapidly than the rest of the tube 2.

In the cut off phase as shown in FIG. 3 the catcher ring 11 is in place beneath the tube 2 and bulb 4. The tube 2 and bulb 4 rotates about their vertical axis. The flame from the cut off burner 9 is impinged upon the cut off area 5 which was preheated in the prior phase. The intense heat from the cut off burner rapidly softens the glass at the cut off area 5.

The weight of the bulb 4 pulls on the glass in the cut off area 5 during the cut off phase as it is melted by the flame from the cut off burner 9. The reducing pressure within the sealed tube 2 and bulb 4 cause the soft attenuating glass at the cut off area 5 to constrict aiding cut off. A blast of cooling gas from the jet 12 impinging upon the bulb 4 or in its vicinity tends to relatively rapidly cool the bulb 4 further reducing the pressure inside the tube 2 and bulb 4, accelerating or even initiating the cut off as the case may be.

As the bulb falls away from the tube under its own weight, aided by the cutting off effect of the constricting of the cut off area 5 due to the reduction of pressure inside the tube 2 and bulb 4, soft glass at the cut off area 5 tends to fuse in a point as part of the falling bulb 4. The severed bulb 4 settles in the catcher ring 11 where the reduced temperature in the bulb 4 continues to act as a suction force and draws the softened fused glass of cut off into the neck 6 of the bulb 4 forming a smooth rounded edge 14 and a U shaped sheath 15 within the neck 6 of the bulb 4.

The bulb 4 in the catcher ring 11 after severance is moved on to other steps in its processing such as annealing and painting.

It is necessary that the tube 2 and bulb 4 be sealed at least in the cut off phase in order to effect pressure reduction inside the tube 2 and bulb 4 brought about by the cooling.

In the preheat phase overall cooling is actually taking place making sealing of the tube 2 and bulb 4 advisable at this phase to get the full effect of the pressure reduction inside the tube 2 and the bulb 4.

In the operation of a glass blowing machine the preheat phase is necessary since the tube 2 and bulb 4 in the progressive step of blowing the bulbs are not left with the flame of the preheat burner 8 impinging upon the cut off area 5 for a sufficient time to permit it or a cut off burner to raise the glass in the cut off area 5 to a severing temperature without risking cracking.

The final phase in the progress of the glass blowing machine 1 shown in FIG. 1 shows the flame of a heating burner 13 impinging on the glass tube 2 preparing it for the further steps in the glass blowing machine's 1 cycle in preparation for the tube 2 to eventually be returned to the blowing mold 3 to start the cycle again.

Figure 4:
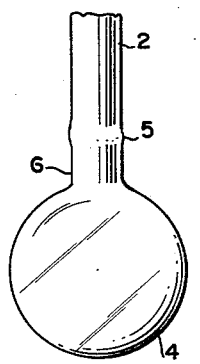
FIGURE 4 is an abbreviated length of glass tube just out of the blowing mold with a blown glass bulb attached.
Figure 5:
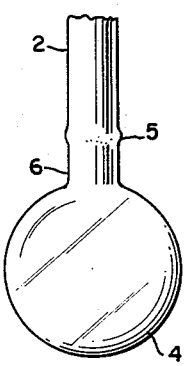
FIGURE 5 is the tube and bulb of FIGURE 6 after being preheated.
Figure 6:
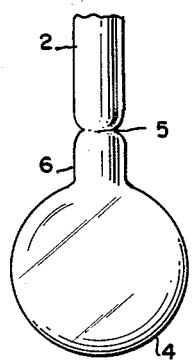
FIGURE 6 is the tube and bulb of FIGURE 5 as it is beginning to sever.
Figure 7:
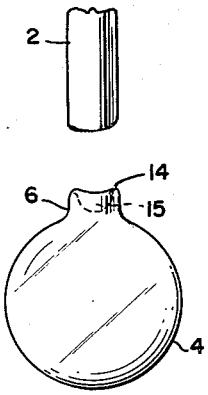
FIGURE 7 is the tube and bulb of FIGURE 6 after they have ben severed with the round edge.
Figure 8:
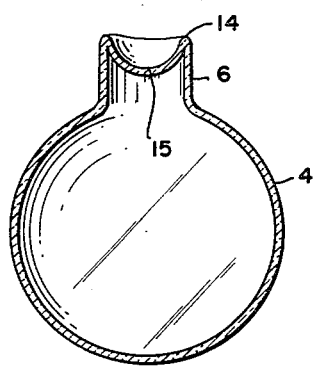
FIGURE 8 is a vertical section of a cut off bulb and glass tube.

FIGS. 4–7 show the progress of the steps of cutting off as they appear on the neck 6 of the bulb 4. In FIG. 4 a glass tube 2 and bulb 4 are shown after being heated at the cut off area 5 by the flame from the preheating burner 8. In FIG. 6 the constriction of the neck 6 of bulb 4 at the cut off area 5 is shown in the cut off phase after the bulb 4 has been heated by the flame from the cut off burner 9 and cooled by the gas from the jet 12. The constriction which forms at the neck 6 of the bulb 4 at the cut off area 5 is shown in FIG. 6 just prior to the bulb's 4 actual severance. In FIG. 7 the glass tube 2 and severed bulb 4 are shown just after severing with the rounded edge 14 formed on the neck 6 of the bulb 4.

The terms and expressions which are employed are used as terms of description, it is recognized, though, that various modifications are possible within the scope of the invention claimed.

What is claimed is:

1. A method of cutting and sealing a blown glass article from a sealed glass tube from which it is blown including the steps of applying a jet blast of heat on the said blown glass tube above its first sealed end at a temperature and rate severing the said blown tube by said heating whereby said blown section seals itself by the fusing of the molten glass as it falls away from said tube maintaining a temperature of the softened sealed end while allowing said blown severed tube to cool creating a pressure differential between the inside and outside of the said severed sealed tube thereby causing the second sealed end of said blown tube to collapse inwardly into the softened end of said severed sealed tube to form a sealed blown glass article.

2. A method of cutting and sealing a blown glass article from a sealed glass tube from which it is blown including the steps of heating the first sealed end of said blown glass tube, applying a jet blast of heat on the said blown glass tube above its first sealed end at a temperature and rate severing the said blown tube by said heating whereby said blown severed section seals itself by the fusing of the molten glass as it falls away from said tube maintaining a temperature of the softened sealed end while allowing said blown severed tube to cool creating a pressure differential between the inside and outside of the said severed sealed tube thereby causing the softened second sealed end of said blown tube to collapse inwardly into the end of said severed sealed tube to form a sealed blown glass article.

3. A method of cutting and sealing a blown glass article from a sealed glass tube from which it is blown including the steps of heating the first sealed end of said blown glass tube, applying a jet blast of heat on the said blown glass tube above its first sealed end at a temperature and rate severing the said blown tube by said heating whereby said blown severed section seals itself by the fusing of the molten glass as it falls away from said tube maintaining a temperature of the softened sealed end while cooling said blown severed tube to create a pressure differential between the inside and outside of the said severed sealed tube thereby causing the softened second sealed end of said blown tube to collapse inwardly into the end of said severed sealed tube to form a sealed blown glass article.

4. A method of cutting and sealing a blown glass article from a sealed glass tube from which it is blown including the steps of applying a jet blast of heat on the said blown glass tube above its first sealed end at a temperature and rate severing the said blown tube by said heating whereby said blown severed section seals itself by the fusing of the molten glass as it falls away from said tube maintaining a temperature of the softened sealed end while cooling said blown severed tube by applying a cooling fluid against said first sealed end to create a pressure differential between the inside and outside of the said severed sealed tube thereby causing the softened second sealed end of said blown tube to collapse inwardly into the end of said severed sealed tube to form a sealed blown glass article.

References Cited by the Examiner

UNITED STATES PATENTS 1,532,077   3/25   Quackenbush et al. _____ 65—227
2,956,372   10/60  Madigan _____ 65—113 X DONALL H. SYLVESTER, *Primary Examiner.*